Jan. 31, 1967    O. D. RATLIFF ET AL    3,301,785
INSULATED SOLID PROPELLANT ROCKET MOTOR

Filed May 2, 1960    2 Sheets-Sheet 1

INVENTORS
OTHO D. RATLIFF
HUGH J. McSPADDEN
BY
William N. Patrick
ATTORNEY

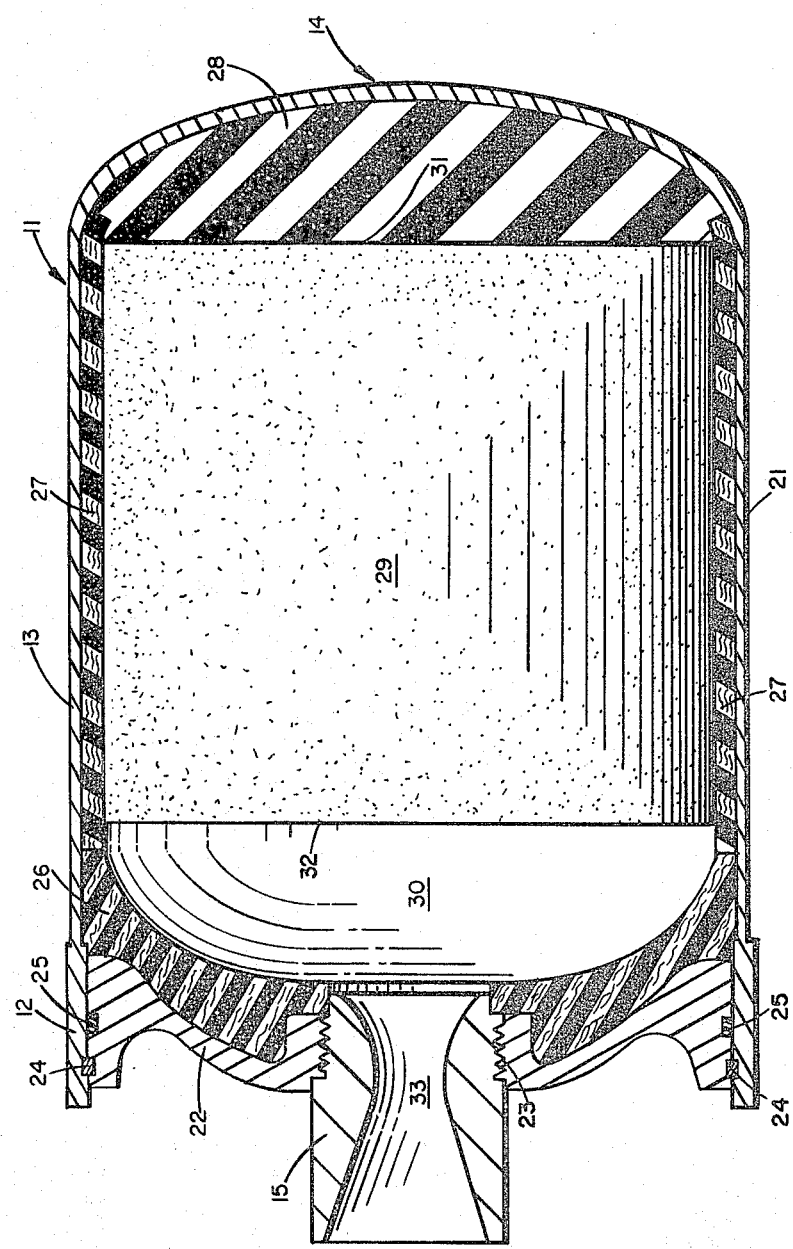

3,301,785
INSULATED SOLID PROPELLANT
ROCKET MOTOR
Otho D. Ratliff, Waco, and Hugh J. McSpadden, Moody,
Tex., assignors to North American Aviation, Inc.
Filed May 2, 1960, Ser. No. 25,984
3 Claims. (Cl. 252—62)

This invention relates to an insulated solid propellant rocket motor. More specifically, this invention relates to a solid propellant rocket motor in which the inner surface of the rocket motor casing is insulated with a novel composition.

The flame temperatures developed in the operation of solid propellant rockets often exceed 5000° F. As the requirement for longer operation of solid propellant rocket engines becomes greater, the need for improved insulation materials to protect the case wall from the extremely high temperatures developed becomes more evident. The insulation must be able to withstand the high temperatures for periods of several minutes. In addition to the flame resistance, the insulation must also withstand erosion which is an action characteristic of combustion products. The primary objective of insulation is protection of the rocket motor casing. The amount of heat that can be tolerated by the case depends upon its material and structural design. In many applications the case temperature must be kept below 300° F. for the duration of the firing. Furthermore, in order to reduce the dead weight of a rocket, the insulation should have as low a density as possible, consistent with the flame and erosion resistance requirements.

It is, therefore, an object of this invention to provide a method of fabricating a solid propellant rocket motor wherein the casing is protected by a novel heat-insulating material. It is also an object of this invention to provide a novel solid propellant rocket motor containing a novel insulating material interposed between the propellant grain and the rocket motor casing. It is also an object of this invention to provide a novel heat-insulating material. Another object is to provide a heat-insulating material useful for insulating the inner surface of rocket motors casings capable of maintaining the temperature of the casing at about 300° F. or lower, when the flame temperature of the burning propellant grain is 5000° F., or higher. It is also an object of this invention to provide a decomposible heat-insulating material which protects a rocket motor casing as it decomposes. Still other objects will be self-evident from the discussion which follows.

The above and other objects of this invention are accomplished by providing a method of fabricating a solid propellant rocket motor comprising providing a solid rocket motor casing, applying a liner material to the inner surface of said casing, said liner material comprising a rubber composition containing from about 50 parts per hundred parts of rubber (phr.) to about 350 phr. asbestos fibers, based on the weight of said rubber composition, and inserting a solid rocket propellant grain within said liner.

The figures in the drawings illustrate a solid propellant rocket motor of this invention. FIG. 1 is a view of the external surface of a solid propellant rocket motor.

FIG. 2 is an axial section view taken along line 2—2 of FIG. 1.

Figure 1:
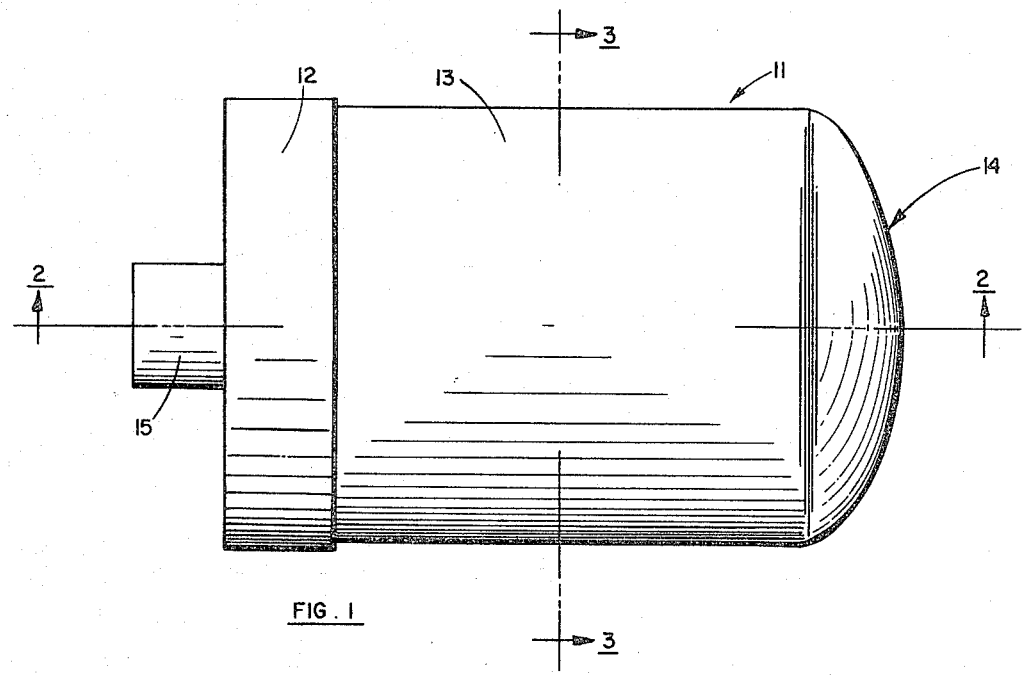

In FIG. 1, the solid propellant rocket motor 11 consists of an aft section 12, a cylindrical body section 13, and a closed fore section 14. A nozzle 15 emerges from the aft section 12.

In the axial section view given in FIG. 2, numerals 11 through 15 correspond to the parts described in connection with FIG. 1. The rocket motor 11 has a casing wall structure 21 which extends from the aft or rear section 12 through the cylindrical body section 13 to and including the closed fore section 14. The aft head 22 is held in place in the aft section 12 by means of a steel key 24 inserted in a matching key slot in the case and head. An O-ring seal 25, made of rubber, is employed between the aft head and the case wall. The nozzle 15 is held in place in aft head 22 by means of screw threads 23 in the aft head and nozzle sections. The aft head 22 is lined with an insulation of this invention 26. A cylindrical layer of insulation 27 is disposed on the inner surface of the walls of the cylindrical body section 13. The lining material is not shown to extend over the inner surface of the rocket motor casing in the fore section 14 in this figure, although it does extend over this surface in other versions of lined solid propellant rocket motors. The solid propellant grain 29 fills the central region of the rocket motor with the forward end defined by line 31 and the aft end of the grain defined by line 32. The space between the fore end 31 and the wall of the fore section 14 is filled with an inert filler 28 in this instance. In other versions of solid propellant rocket motors, this area is filled with solid propellant grain material. The propellant grain is either of the end-burning variety, in which case the burning surface is represented by the surface bounded by line 32, or it is a grain having a coaxial firing chamber. In the case of an end-burning propellant, a plenum chamber 30 is provided in the aft section of the motor, which plenum chamber communicates with the nozzle area 33. In the case of a propellant grain having a coaxial burning chamber, the propellant grain extends to the aft head or the insulation on the aft head. In another version, the propellant grain is a combination of end-burning grain with a coaxial firing chamber.

Figure 3:
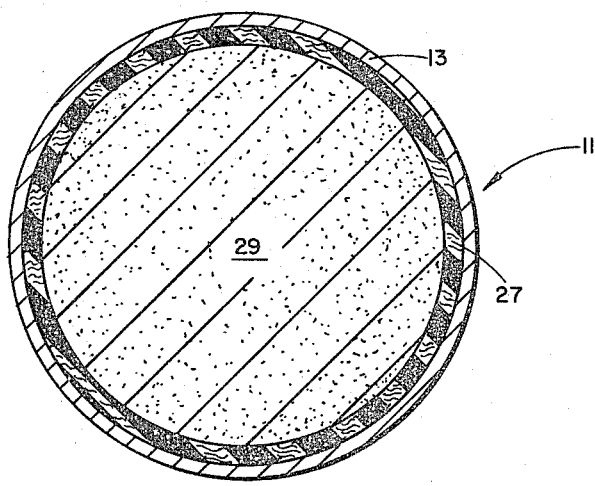
FIG. 3 is a cross sectional view taken along line 3—3 of FIG. 1.

FIG. 3 is a cross sectional view of the rocket motor taken along line 3—3 of FIG. 1. The numerals in FIG. 3 relate to component parts as described in connection with FIGS. 1 and 2.

In general, the insulating material employed in this invention consists of a heat-insulating substance, such as asbestos, in the form of fine fibers or powder held together with a binder of a rubber composition. The rubber that is employed as a binder for the insulating liner is any one or a combination of a number of polymers and copolymers generally known as rubbers. The rubber is either of the natural or synthetic variety. Non-limiting examples of synthetic rubbers employed include the butadiene-styrene rubbers, neoprene, nitrile rubber, fluoropolymers, butyl rubber, silicone elastomers, Thiokol rubbers, butadiene-2-methyl-5-vinylpyridine rubber, and various combinations and mixtures of the above rubbers, etc. All the above rubbers and others that are used are well known in the art. The properties and methods of preparation are found in such texts as, "Synthetic Rubber," by Whitby, published by John Wiley and Sons, Inc., New York, and "Introduction to the Chemistry of the Silicones," by Rochow, 2nd edition, published by John Wiley and Sons, Inc., as well as in other patent and technical publications.

In particular, it is found that a copolymer of butadiene with from about 5 to about 50 weight percent of 2-methyl-5-vinylpyridine, based on the combined weight of the rubber and the 2-methyl-5-vinylpyridine, provides good heat insulation. A lining composition in which the binder is made of this type of rubber, therefore, constitutes a preferred embodiment of this invention.

It is found also that a blend of polymers such as butadiene and 2-methyl-5-vinylpyridine polymer and neoprene rubbers give exceptionally good heat insulation, as is shown later in this writing. Therefore, an especially preferred embodiment of this invention is the use of a rubber binder for the insulating components of a blend of (a) a copolymer of butadiene with from 5 to about 50 weight percent of 2-methyl-5-vinylpyridine, based on the combined weight of the butadiene and 2-methyl-5-vinylpyridine components, and (b) from about 5 to about 40 weight percent of neoprene, based on the combined weight of (a) and (b). This blend is employed to bind together from about 50 phr. to about 350 phr. asbestos fibers, based on the weight of the rubber composition.

It has been found that the addition of a halogenated paraffin wax composition to the rubber binder of the liner of this invention reduces the heat transmitted through the liner. The halogen of the halogenated paraffin wax has an atomic weight ranging from about 19 to about 80, namely fluorine, chlorine, or bromine. The reduction of heat transmission is brought about by halogenated paraffins containing from about 5 to about 75 weight percent halogen, based on the total weight of the halogenated paraffin. A non-limiting example of the halogenated paraffin wax is the chlorination of the paraffin wax originally having a density of 0.890 and a melting point in the range of from about 43° C. to about 65° C. to provide a product containing from about 5 to about 75 weight percent chlorine. Chlorinated paraffin wax is referred to in the art as chlorowax. It is commercially available. Its preparation is well known and will not be discussed in this writing. Chlorinated paraffins, chlorowax, containing from about 40 to about 70 weight percent chlorine, are found to provide marked reduction in the heat transmission property of heat-insulating materials, and the use of this chlorinated paraffin is, therefore, a preferred embodiment of this invention.

As small an amount as one phr. of a halogenated paraffin, based on the weight of the rubber, gives a perceptible reduction in the heat transmission. This reduction of heat transmission is increased as the amount of the halogenated paraffin is increased. However, as the amount of halogenated paraffin added approaches about 40 phr., the relative heat reduction goes down. Therefore, no particular advantage is obtained in adding more than about 40 phr. of halogenated paraffin. Accordingly, a preferred embodiment of this invention is the use of from 1 to about 40 phr. halogenated paraffin. It is found, however, that a more significant reduction in the heat transmission is observed when the amount of halogenated paraffin added varies from about 5 to about 35 phr., and the addition of this amount constitutes an especially preferred embodiment of this invention.

It is found that the addition of metal oxides, such as antimony trioxide, also provide a reduction in the heat transmission properties of the insulating material. As low an amount as 0.5 phr. metal oxide added produces a perceptible reduction in the heat transmission of the insulator. This reduction in the transmission is increased with increased amounts of metal oxide added up to about 10 phr. Amounts above about 10 phr. are not considered practical in the insulators since it would cut down the amount of other solid components that are incorporated in the material. A preferred embodiment of this invention, therefore, is the use of from about 0.5 to about 10 phr. metal oxide flame retardant.

The asbestos employed in the preparation of the liner composition is in powder form and consists of tiny fibers capable of passing through a screen with 0.053 inch opening. The amount of asbestos employed is from about 50 phr. to about 350 phr. It is found that at least about 50 phr. asbestos is required to provide an insulation of suitable consistence which will minimize the amount of heat transmitted. Lower amounts than 50 phr. of asbestos can also be used but the reduction in heat transmission is, of course, correspondingly reduced. When the amount of asbestos is about 350 phr. or more, the latter composition begins to delaminate upon exposure to flame temperatures and therefore it is preferred not to employ asbestos in concentrations above about the latter figure. Delamination results in a reduction in physical strength and increases the surface area exposed to the flame.

Organic and inorganic reinforcing agents or fillers are also added in some instances. A non-limiting example of a filler is silica of a particle size ranging from about 0.01 to about 0.1 micron in diameter and having an average diameter of about 0.02 micron. Other filler materials employed in the liners are one or more of the substances selected from the class consisting of silicates such as calcium silicate, aluminum silicate and mica; various glazes such as fuller's earth, bentonite, diatomaceous earth clay, etc.; various metal oxides such as alumina, zirconia, titanium dioxide, chromic oxide, etc.; and sulphates such as barium sulphate, lead sulphate, etc. The use of still other types of fillers will readily suggest themselves to those skilled in the art. The particle size of the various fillers can vary from about 30 to about 300 millimicrons.

The butadiene-2-methyl-5-vinylpyridine rubbers employed in the preparations of the liners of this invention contain from about 0 to about 20 weight percent carbon black as a reinforcing agent. The butadiene-styrene rubbers in the examples given hereinbelow contain zero weight percent carbon black. The carbon black that is used as a filler can have a particle of from about 1 to about 100 millimicrons.

When the filling substances are added, they range in amounts from about 1 phr. to about 100 phr. The fillers serve to improve mechanical properties and erosion resistance. When about 1 phr. of the filler is added the physical properties will exhibit an increase in elongation and result in an insulation with a greater tendency to erode. When about 100 phr. of filler is added a higher strength material will result which will withstand erosion better than materials having lesser amounts of the reinforcing filler. However, there is a corresponding loss in elasticity and amounts of filler greater than 100 phr. are usually not employed.

Plasticizers are often used in the preparation of liners in order to aid in the milling of the rubber and asbestos mixtures and also to assist in the curing. Plasticizers found suitable for this purpose are the fatty acids having from about 8 to about 36 carbon atoms and include such compounds as stearic acid, lauric acid, oleic acid, octanoic acid, linoleic acid, and linoleic acid dimer. These compounds may be used either singly or as mixtures of two or more in amounts of from about 0.5 to about 75 phr. An amount of 0.5 phr. plasticizer improves the ease of processing the composition. Other plasticizers which are used include such materials as zinc and aluminum stearate which are salts of fatty acids; aliphatic esters such as dibutylsebacate, dioctylsebacate, diisobutylsebacate, etc.; aromatic esters such as dioctylphthalate, dicaprylphthalate, tributoxethylphosphate, tricresylphosphate, and aromatic and naphthenic base petroleum oils.

In order to have the rubber set when heat-treated, the rubber composition employed in this invention contains sulphur or sulphur-containing agents. These substances are well known in the rubber field and include such material as sulphur, thiuram sulphides such as bis-(dimethylthiocarbamyl)disulphide; thiazoles such as thiazole and mercaptobenzothiazole; selenium, tellurium, copper, bismuth, and zinc dialkydithiocarbamates such as tellurium diethylthiocarbamate and zinc dimethyldithiocarbamate; and the like. The sulfurization agent is present in the rubber in amounts of from about 2 to about 15 phr.

Halogen-containing compounds, such as 1,4-bis(trichloromethyl)benzene, etc., are also used as curing agents.

Still other additives can also be added to the composition, as for example, antioxidants such as phenyl-β-naphthylamine, triphenylphosphate, alkylated phenols, etc. These antioxidants may be added in amounts up to about 8 phr. There are many other antioxidants used in the rubber field, the use of which will be apparent to those skilled in the art.

Accelerators such as mercaptoamidoazeline and p,p'-diaminophenylmethane, zinc oxide, magnesium oxide, etc., are also added in some instances in amounts of from about 0.1 to about 5 phr. Still other additives employed in compounding of rubbers and rubber compositions will be apparent to those skilled in the art. Various such additives are discussed in the text books cited hereinabove.

The components of the liner composition of this invention are thoroughly mixed together in a suitable mixer such as, for example, a Banbury mixer or on a rubber mill.

The rubber or rubbers, fillers, plasticizers and antioxidants are mixed in the Banbury mixer to form the master batch. The curing agents are later added to the above master batch on a rubber roll mill. The final compound is then sheeted to the desired dimensions by the use of a roll mill, a three or four roll calendar mill, or extruded into tubular shapes with a screw extruder.

The rocket propellant grains are made up of oxidizer particles held together by a binder material. The oxidizer particles employed are anhydrous and have the general formula $M(ClO_4)_x$ wherein M is $NH_4$ or a metal, and $x$ is the valence of M. Since the propellant composition is required to withstand high temperature storage, it is preferable that the melting point and the decomposition temperatures of the oxidizer be as high as possible. The perchlorates of the Group I–A, Group I–B, and Group II–A metals are found to have the required high temperature stability and are employed in the preparation of propellant compositions by the process of this invention. Hence, the metal perchlorates used in the preparation of the propellant compositions include lithium perchlorate, sodium perchlorate, pottasium perchlorate, rubidium perchlorate, and cesium perchlorate, which are the perchlorates of the metals of Group I–A of the Periodic Table of Elements; silver perchlorate which is a perchlorate of a Group I–B metal; and magnesium perchlorate, calcium perchlorate, strontium perchlorate, and barium perchlorate, which are the perchlorates of the Group II–A metals. In addition to the metal perchlorates, the compound ammonium perchlorate finds extensive use in propellant compositions. Examples of the nitrates of the Group I–A, I–B, and II–B which are employed in preparing propellant compositions by the process of this invention are compounds such as lithium nitrate, sodium nitrate, potassium nitrate, magnesium nitrate, calcium nitrate, barium nitrate, strontium nitrate, etc. Ammonium nitrate is also used.

The ratio of solids-to-polymeric binder material in a propellant falls in the range of from about 1:1 to about 9:1, with an optimum ratio of about 8:2.

The particles sizes of the oxidizer vary from about 1 to about 500 microns. In preparing the propellant grain, two different sizes of particles are employed, fines having a particle size of from about 1 to about 75 microns, and coarse having a particle size of from about 50 to about 500 microns. A non-limiting specific example of an oxidizer composition comprises 30 weight percent fines having a particle size of from about 10 to about 40 microns, and 70 weight percent coarse having a particle size of from about 100 to about 200 microns.

Among polymer materials employed as binders for the oxidizer particles are substances such as polymerized di(thioethoxy)methylene, polybutadiene-acrylic acid copolymer, butadiene-2-methyl-5-vinylpyridine copolymer, Thiokol rubbers, rubbers of the types described in the text, "Synthetic Rubber," by Whitby, published by John Wiley and Sons, and silicone polymers and rubbers of the type described in a text entitled, "Introduction to the Chemistry of the Silicones," supra. An example of a silicone polymer is a silicone gum obtained by heating a hydrolysate of a mixture of 90 mol percent dimethyldichlorosilane and 10 mol percent of diphenyldichlorosilane in the presence of a small amount of iron chloride. The composition is subjected to heating only for a period of time sufficient to obtain a viscous liquid. Another polymeric material that can be used in an epoxy compound such as the product obtained by the reaction of a mol of 2,2-bis(4-hydroxyphenyl)propane with one or more mols of epichlorohydrin in the presence of a base such as sodium hydroxide. This gives a glycidyl polyether having terminal epoxy groups. Another example of a polymeric material is a polyurethane material such as a copolymer of polypropylene glycol and toluene diisocyanate. Other resins and polymeric substances that can be used will be apparent to those skilled in the art.

A non-limiting example of a polyurethane binder is one obtained by the polymerization of polypropylene glycol having an average molecular weight of about 2,050 and toluene diisocyanate in proportions such that the equivalents of the —NCO groups-to —OH groups is substantially 2:1. During the reaction, accomplished with the aid of heat, samples are periodically withdrawn and titrated for residual —NCO groups. When one-half of the —NCO groups have been used up in the polymerization, butanediol is added in amounts to provide a ratio of —NCO groups-to-added —OH groups of substantially 2:1. The heating is continued until the reaction ceases. This constitutes what is known in the art as a prepolymer composition. This prepolymer composition is then mixed with the oxidizer particles and with a curing agent such as polyphenylpolyisocyanate in amounts such as to provide a ratio of mols of butanediol previously added-to —NCO groups in the polyphenylpolyisocyanate of from about 1:1 to about 2:1. The mixture is cast into a suitable mold and cured at elevated temperatures of substantially 73° C. for a period of substantially 73 hours. Other resins and polymeric substances in the preparation of solid propellant grains will be apparent to those skilled in the art. An example of a rubber binder is the use of a polybutadiene and 10 weight percent acrylic acid copolymer cured with 10 weight percent epoxy resin. An example of an epoxy resin is the reaction product of epichlorohydrin and 2,2-bis(4-hydroxyphenyl)propane in the molar ratio of 1:1, polymerized to provide a product having an epoxide equivalent of about 190–210.

Additives employed with propellant compositions include burning rate catalysts and depressants, stabilizers, antioxidants, curing catalysts, plasticizers, heat stabilizers, etc. These are all well known in the art and will not be discussed in this writing.

The following examples will more clearly illustrate the case liner and rocket motor of this invention.

EXAMPLE I

The following components were mixed together and rolled into a sheet substantially 0.30 inch thick by the process described hereinabove in which the amounts are given in parts by weight: 80 parts butadiene-2-methyl-5-vinylpyridine copolymer in which the weight ratio of butadiene-to-2-methyl-5-beta-vinylpyridine is substantially 85:15, 20 parts of neoprene, 3 parts phenyl-beta-naphthylamine antioxidant, 3 parts zinc oxide, 1 part stearic acid, 200 parts of powdered asbestos having fiber dimensions small enough to pass through a screen with a 0.053 inch opening, 20 parts hydrated silica having an average particle size of substantially 0.02 micron in diameter, 10 parts dioctylphthalate plasticizer, 3 parts of 1,4-bistrichloromethylbenzene, and 1 part barium salt of linoleic acid. A sample of this composition, after curing, has the following physical properties: elongation, 110%, ultimate tensile strength, 1235 p.s.i. Shore "A" hardness 95, density 1.80 grams per cc.

A cured sample of the composition of Example I measuring 2" x 2" x 0.3" thick, was mounted on an insulation support block made of glass wool. A thermocouple was placed on the surface of the test sample next to the insulation support block. An oxygen-natural gas torch flame at a temperature of about 3500° F. was directed at the surface of the test specimen opposite to the surface adjacent to the thermocouple. The temperature after 5 minutes of heating, as indicated by the thermocouple, was only about 515° F. After 20 minutes of heating, the temperature was only about 1275° F. This illustrates the remarkable heat insulation provided by the composition of this invention. This insulation will readily keep the temperature of the casing below about 300° F. since the firing time of a propellant grain in a rocket motor is usually not more than about 4 minutes.

EXAMPLE II

A 0.50 inch thick sheet of an insulation of Example I was molded onto the inside of the aft head of a rocket motor of the type illustrated in the drawing. The steel head was removed from the rocket motor and coated with a chlorinated natural rubber adhesive. The insulation was then vulcanized to the head by curing at 320° F. at a pressure of 1,000 p.s.i. for 4 hours. The cylindrical portion of the case was insulated with a 0.3 inch layer of the binder composition of Example I. The insulation was formed into a cylindrical sleeve that fits snugly into the steel case. Care was taken in assembly of the motor to insure that the wall insulation overlapped the molded aft head insulation to insure protection of the case at that joint. The wall insulation was not bonded to the wall of the motor. The insulation on the walls of the rocket motor was not cured. The rocket motor was then loaded with a propellant grain comprising ammonium nitrate particles bonded together with 20 weight percent butadiene and 2-methyl-5-vinylpyridine polymer in the weight ratio of 85:15. The fore part of the rocket motor was filled with an inert filler comprising a 20 weight percent carbon black filled Thiokol LP-3 polysulfide rubber. The dimensions of the rocket motor were 10 inches outside diameter, 9.5 inches inside diameter, and 18 inches in length, and the grain was 8 inches in diameter, 13 inches in length. The plenum chamber in the aft portion of the rocket motor was about 4 inches deep. After the loading of the grain in the rocket motor casing, the head was mounted in the casing and held in place as described above.

Testing the performance of the rocket motor of this invention consisted of firing the rocket while anchored to a stand. The rocket motor was ignited by electrically actuating an igniter of a pyrotechnic composition placed in the firing chamber. The pyrotechnic composition is composed of such material as black powder or a mixture of ammonium perchlorate and powdered metal such as aluminum, iron, magnesium, etc. The pressure generated within the firing chamber of the rocket is measured by means of a pressure pick-up. The thrust is measured by attaching the motor to a thrust cell which contains a strain gauge adapted to indicate the magnitude of the thrust on an oscillograph to which it is connected. The rocket motors of this invention containing the insulation as described hereinabove, when tested by this procedure, all give good results with respect to reduction of heat transmission to the casing shell which includes the casing wall and the motor head. The head of the rocket motor was removed after each 100-second firing. The insulator surface was found to be smooth and hard, with almost no ash being present. The exposed surface was charred and fused to a depth of about 0.02 inch. At greater depths, the insulation appeared to be unchanged. Since the case wall insulation was not cured under pressure, the charring was somewhat deeper but the general condition was much the same as that on the head.

EXAMPLE III

A motor was insulated as described in Example II, and the rocket propellant composition comprising ammonium perchlorate together with 18 weight percent polybutadiene and acrylic acid binder, in the weight ratio of 85:15, was cast directly into the insulated motor so as to provide an end-burning grain. The motor was test-fired, as described above. The flame temperature was in excess of 5000° F. The motor was fired for a period of 110 seconds. The temperature at the outer surface of the case was below 550° F. Very little erosion of the insulator occurred.

EXAMPLE IV

The procedure of Example III is repeated, employing a fiber glass reinforced plastic case made of an epoxy resin obtained by copolymerizing epichlorohydrin and 2,2-bis-(4-hydroxyphenyl)propane in the molar ratio of substantially 1:1, together with about 5 weight percent diethylenetriamine curing agent. The head containing the nozzle is made of steel and is fastened to the cylindrical walls of the rocket motor plastic casing by bolts inserted through holes drilled through both the plastic casing and the head. Test firing the rocket motor of Example IV, it is found that the exterior walls of the plastic casing are maintained at a temperature below 250° F.

Comparable results are obtained when other plastic casing materials are used.

A number of liner compositions, together with the physical properties of the finished product, are given in the following tables.

A number of the components in Table I are identified as follows.

(a) Rubber A in Batch No. 1 and No. 6 is composed of a copolymer of butadiene and 2-methyl-5-vinylpyridine in the weight ratio of 90 butadiene-to-10 2-methyl-5-vinylpyridine. This rubber also contains 22.5 phr. of carbon black. Rubber A in Batch No. 2 is composed of a butadiene-styrene-2-vinyl-pyridine terpolymer in the weight ratio of about 95:5:5. Rubber A in Batch No. 7 is composed of a terpolymer of butadiene, styrene, and 2,4-diethyl-6-vinylpyridine in the weight ratio of about 30:20:50.

(b) Rubber B is composed of a copolymer of butadiene and 2-methyl-5-vinylpyridine in the weight ratio of 85-to-15 butadiene-to-methylvinylpyridine.

TABLE I.—INSULATION MATERIALS BASED ON BUTADIENE-METHYLVINYLPYRIDINE RUBBER

| | Batch No. (Parts per 100 parts Rubber) | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Rubber A (a) | 91.8 | 122.50 | | | | 91.8 | 122.50 | | | | | | |
| Rubber B (b) Philprene VP-15 | | | 80.0 | 80.0 | 80.0 | | | 80.0 | 95.0 | 60.0 | | 100 | 100 |
| Rubber C (c) Neoprene WRT | 25.0 | | 20.0 | 20.0 | 20.0 | 25.0 | | 20.0 | 5.0 | 40.0 | | | |
| Pentachlorothiophenol | | | | | | | | 3.2 | | | | | 4 |
| N,N'-diphenyl-p-phenylenediamine | 5.0 | 1.0 | 3.0 | 3.0 | 3.0 | 5.0 | 8 | 3.0 | 10 | | 3 | 3 | |
| Triphenyl phosphate | | | | | | | | | 1.0 | | | | |
| Phenyl-β-naphthyl amine | | | | | | | | | | 8.0 | | | 5 |
| Rubber D (d) | | | | | | | | | | | 100 | | |
| Zinc oxide | | | 3.0 | 3.0 | 3.0 | | | 3.0 | 1.0 | | | | 5 |
| Magnesium oxide | | | | | | | | | | 5.0 | | | 10 |
| Stearic Acid | | | 1.0 | 1.0 | 1.0 | | | 1.0 | 0.5 | 3.0 | | | |
| Asbestos (e) | 100.0 | 50 | 200.0 | 200.0 | 200.0 | 100.0 | 350 | 350.0 | 50 | 350 | | | |
| Alumina | | | | | | | | | | | | | 200 |
| Silica (f) | | | 20.0 | 20.0 | 20.0 | 100.0 | | 35.0 | | | 25 | 25 | |
| Mixed dimethylphenylphosphites | | | | | | | | | | | | | 5 |
| Sulfur | | | | | | | | | | | 5 | | |
| Carbon black | | | | | | | | | | | | | 75 |
| Tricresylphosphate | | | 10.0 | | 10.0 | | | | | | | | |
| Chlorowax-40 (g) | | | | 25.0 | | 25.0 | | | 1 | | 25 | 25 | |
| Chlorowax-70 (h) | | | | | 25.0 | | | | | 40 | | | |
| Halogenwax-5 (j) | | | | | | | | | 5 | | | | |
| Halogenwax-75 (k) | | | | | | | | | | 35 | | | |
| Antimony Trioxide (l) | | | | 5.0 | 5.0 | 5.0 | 10 | | | | 5 | 5 | |
| Mixed dixylyldisulfides | | | | | | | | 25.0 | | | | | 25 |
| 1,4-bis(trichloromethyl)benzene | 3.0 | 0.5 | 3.0 | 3.0 | 3.0 | 5.0 | | 3.0 | 1 | 8 | | 5 | 15 |
| Barium salt of octanoic acid | 1.0 | | 1.0 | 1.0 | 1.0 | 1.0 | | 1.0 | | | | 1 | |
| Zinc dimethyl dithiocarbamate | | | | | | | | | | | 2.5 | | |
| Physical properties: | | | | | | | | | | | | | |
| Elongation, percent | 350 | | 110 | 60 | 120 | 30 | | 40 | | | 140 | 390 | |
| Ultimate tensile, p.s.i. | 1,245 | | 1,235 | 1,320 | 1,620 | 1,330 | | 1,480 | | | 510 | 495 | |
| Stress at 300% elongation | 1,200 | | | | | | | | | | *345 | 435 | |
| Shore "A" Hardness | 88 | | 95 | 92 | 95 | 100+ | | 100+ | | | 65 | 58 | |
| Density, g./cc. | 1.5 | | 1.80 | 1.77 | 1.73 | 1.61 | | 1.91 | | | 1.15 | 1.15 | |
| Lab Flame Test: | | | | | | | | | | | | | |
| °F. at 20 min | 1,825 | | 1,275 | 1,145 | 1,034 | 1,090 | | 855 | | | | | |
| °F. at 5 min | 700 | | 515 | 425 | 460 | 525 | | 380 | | | | | |

*100% elongation.

(c) Rubber C is neoprene, which is a polymeric chloroprene rubber. It contains no sulphur, thiuram disulfide, or other compounds capable of decomposing to yield either free sulphur or a vulcanization accelerator.

(d) Rubber D is composed of a butadiene-styrene copolymer in the weight ratio of 91-to-9 butadiene-to-styrene.

(e) The asbestos is composed of fibers capable of passing a screen with a 0.053 inch opening.

(f) The silica is of a particle size having an average diameter of about 0.02 micron.

(g) Chlorowax-40 is a chlorinated paraffin having 40 percent chlorine by weight.

(h) Chlorowax-70 is a chlorinated paraffin having 70 percent by weight.

(j) Halogenwax-5 is a halogenated paraffin wax containing 55 weight percent chlorine.

(k) Halogenwax-75 is a halogenated paraffin wax containing 75 weight percent chlorine.

(l) The particle size of the antimony trioxide and other flame retardant metal oxides is 5 mm. or below, and is further reduced during the mixing of the compound.

TABLE II.—INSULATION MATERIALS BASED ON BUTADIENE-STYRENE RUBBER

| | Batch No. (Parts per 100 parts of rubber) | | | | | | | | | |
|---|---|---|---|---|---|---|---|---|---|---|
| | 1 | 2 | 3 | 4 | 5 | 6 | 7 | 8 | 9 | 10 |
| Rubber I [i] | 100 | 100 | 100 | 100 | 100 | 100 | 100 | 100 | 100 | 100 |
| Pentachlorothiophenol | | 4 | 4 | 4 | 4 | 4 | 4 | 4 | 4 | 4 |
| Diphenylketone and N,N'-diphenyl-p-phenylene diamine reaction product | 3 | 3 | 3 | 3 | 3 | 3 | 3 | 3 | 3 | 3 |
| Zinc Oxide | 2 | 2 | 2 | 2 | 2 | 2 | 2 | 2 | 2 | 2 |
| Stearic Acid | 3 | 3 | 3 | 3 | 3 | 3 | 3 | 3 | 3 | 3 |
| Asbestos | | 50 | 100 | 150 | 250 | 350 | 250 | 250 | 350 | 350 |
| Phenolic Varnish, rubber modified (dry basis) | | | | | | | | | 50 | 50 |
| Glass Beads 140 mesh | | | | | | | 25 | | | |
| Chlorowax-40 | | | | | | | | 25 | | |
| Chlorowax-70 | | | | | | | 5 | 5 | | |
| Antimony Trioxide | | | | | | | | | | 25 |
| Mixed dixylyl disulfides | | 25 | 25 | 25 | 25 | 25 | | | | |
| Sulfur | 5 | 3 | 3 | 2.5 | 2.5 | 4 | 4 | 4 | 4 | 5 |
| Zinc dimethyl dithiocarbamate | | | | 3.0 | 3.0 | | | | | |
| Sulfonamide X [ii] | 3 | 1 | 1 | | | 2 | 1.5 | 1 | 2 | 3 |
| Physical Properties: | | | | | | | | | | |
| Elongation, percent | 115 | 590 | 630 | 950 | 650 | 485 | 400 | 105 | 10 | 400 |
| Ultimate Tensile, p.s.i. | 225 | 210 | 320 | 300 | 415 | 1,210 | 660 | 1,250 | 1,810 | 385 |
| Stress at 300% | | 160 | 220 | | | 1,060 | | | | 350 |
| Shore "A" Hardness | 50 | 46 | 59 | 59 | 81 | 90 | 86 | 96 | 100+ | 84 |
| Density, g./cc. | 0.98 | 1.20 | 1.36 | 1.49 | 1.69 | 1.86 | 1.79 | 1.77 | 1.82 | 1.77 |
| Lab Flame Test, °F. at 20 min | (v) | (iii) | (iv) | 1,275 | 1,505 | 1,175 | 785 | 1,030 | 1,405 | 1,325 |
| Lab Flame Test, °F. at 5 min | | (iii) | 300 | 675 | 950 | 509 | 320 | 580 | 630 | 525 |
| Lab Flame Test, °F. at 2 min | | 165 | 200 | 242 | 353 | 261 | | | | |

[i] Rubber I is a copolymer of 91 weight percent butadiene and 9 weight percent styrene.
[ii] Sulfonamide X is N-cyclohexyl-2-benzothiazyl-sulfonamide.
[iii] Burned through in 4 min. 44 sec.—temperature at burn-through 337° F.
[iv] Burned through in 5 min. 18 sec.
[v] Burned through in 40 sec.

From Table I, it is seen that Composition No. 11 differs from Composition No. 12 in that the former contains no rubber having a methyl-vinylpyridine component. The insulation properties of these two compositions were tested by the flame test described above. A sample of each composition, 2" x 2" x 0.3", was subjected to a flame having a temperature of substantially 3500° F. It was found that the surface of the sample opposite to the surface at which the flame was directed reached a temperature of 500° F. in a period of 10 minutes in the case of the sample containing no methyl-vinylpyridine component, whereas the other sample, containing the methyl-vinylpyridine component, reached a temperature of substantially only 300° F. in the same period of time. Thus, the presence of the methylvinylpyridine component increased the insulating properties of the liner by about 40% with respect to temperature transmitted in a given period of time. In a period of 7½ minutes, sample No. 11 indicated a temperature of 300° F. on the surface opposite the flame, whereas sample No. 12 containing methylvinylpyridine polymeric components, registered a temperature of only 200° F. on the surface opposite the flame. Thus, it is seen that the protection rendered by the composition containing the methylvinylpyridine component was about 33% better for the given period of time.

Comparing No. 4 with No. 3 in Table I, it is seen that the addition of chlorowax-40 and antimony trioxide reduces the heat transferred during 5 minutes of heating with a natural gas oxygen flame by 90 degrees. This constitutes an improvement of about 21% for compositions containing chlorowax-40 and antimony trioxide. Therefore, compositions containing the flame retardant constitute a preferred embodiment of this invention.

EXAMPLE V

The procedure of Example III was repeated in the manufacture of a rocket motor containing an insulator of this invention, with the modification that the rocket motor measured 59 inches in length and 19 inches in diameter to provide for a firing time of 190 seconds. In this motor, a two-ply insulation system was employed consisting of a 0.2" layer of the composition of Example I next to the casing wall, and a 0.2" layer of composition No. 1 of Table I next to the propellant grain. The layers touched, but were not bonded together. The propellant was cast directly against the latter layer of insulation so that the insulator also served as a burning surface restrictor. Graphs were plotted for the pressure versus time for firing of motors of this type. The temperature on the outside of the motor casing was monitored during firing. Both restriction and insulation were found to be excellent. The pressure-time curves remained essentially flat throughout the firing and the case temperature remained below 350° F. for the full duration of the firing. The propellant grain consisted of ammonium perchlorate bonded with polybutadiene acrylic acid copolymer. The flame temperature of the burning propellant was substantially 5120° F.

An advantage of the rubber insulators of this invention over the use of plastic insulators, the use of which has been attempted previously, is that the rubber insulators are more flexible and allow the insulating material to yield with the head of the rocket motor during pressurization due to firing. Consequently, no gas penetrates to the walls of the rocket motor casing and failure of the motor casing is obviated. Other advantages have been discussed above.

The compositions of other vinylpyridine-containing rubbers employed in the preparation of the liners of this invention are given in the text, "Synthetic Rubber," by Whitby, supra. Various non-limiting examples of rubbers employed are found on pages 694–698 and 724–726. Included are butadiene copolymers with vinylpyridines such as 2-vinylpyridine, 3-vinylpyridine, 4-vinylpyridine, 2-methyl-6-vinylpyridine, 5-ethyl-2-vinylpyridine, 2,4-dimethyl-6-vinylpyridine, etc., as well as butadiene copolymers with mixtures of two or more different vinylpyridines. Other vinylpyridine rubbers employed are, for example, butadiene-styrene-2-vinylpyridine in the weight ratio of 72:18:10. Copolymers of butadiene-styrene in the weight ratio ranging from 99:1 to about 60:40, together with various vinylpyridines of the type disclosed above and mixtures thereof in amounts ranging from about 5 to about 50 weight percent, based on the total weight of the butadiene-styrene-vinylpyridine components, are also employed. The use of still other vinylpyridine-containing rubbers will be apparent to those skilled in the art when taken in conjunction with this teaching. When the above vinylpyridine-containing blends are employed, together with neoprene, the latter component is present in an amount of from about 5 to about 40 weight percent, based on the weight of the rubber.

The designation "rubber" in the term "parts per hundred parts of rubber (phr.)" refers to those components ordinarily known in the art as rubber and not to additives such as halogenated wax, for example. In this writing, the components coming within the designation of rubber in the expression "phr." have been referred to as rubber components.

The liner composition of this invention is employed for lining the internal surfaces of combustion chambers of gas generators. The gas generators are employed in the production of combustion product gases which are utilized for powering auxiliary equipment. One example is the operation of turbine activated liquid propellant pumps in rocket motor systems. The gas generators employ either liquid or solid propellant fuels, or both. The lining of combustion chambers of liquid propellant-powered rocket motors as well as rocket motors powered by hybrid liquid-solid propellant combinations. Accordingly, although, for ease of illustration, the examples given above relate to the use of lining composition in the combustion chambers of solid propellant fueled motors, the scope of this application includes the lining of the interior surface of any combustion chamber.

Although the invention has been described and illustrated in detail, it is to be clearly understood that the same is by way of illustration and example only, and is not to be taken by way of limitation, the spirit and scope of this invention being limited only by the terms of the appended claims.

We claim:
1. A heat insulating material comprising (1) a copolymer of butadiene and methyl-vinylpyridine containing from about 5 to about 50 weight percent methyl-vinylpyridine components, based on the total weight of the copolymer, and (2) from 50 phr. to about 350 phr. asbestos powder consisting of fine fibers distributed throughout said copolymer.

2. A heat insulating material comprising (1) a copolymer of butadiene, styrene, and methyl-vinylpyridine components wherein the weight ratio of butadiene-to-styrene is from about 99:1 to about 60:40, and the weight of methyl-vinylpyridine components is from about 5 to about 50 weight percent, based on the total weight of said copolymer, and (2) from 50 phr. to about 350 phr. asbestos powder consisting of fine fibers distributed throughout said copolymer.

3. A heating insulating material comprising:
a copolymer of butadiene, styrene, 2-methyl-5-vinylpyridine components and polymers of chloroprene, wherein:
the weight ratio of butadiene to styrene is from about 99:1 to about 60:40,
the amount of 2-methyl-5-vinylpyridine components is from about 5 to about 50 weight percent, based on the weight of said butadiene, styrene and 2-methyl-5-vinylpyridine components,
the amount of polymers of chloroprene is from about 5 to about 40 weight percent, based on the combined weight of said copolymer,
up to about 40 phr. of a metal oxide flame retardant,
and from about 50 phr. to about 350 phr. asbestos powder consisting of fine fibers distributed therethrough.

References Cited by the Examiner

UNITED STATES PATENTS

| | | | |
|---|---|---|---|
| 2,563,265 | 8/1951 | Parson | 60—35.6 |
| 2,706,382 | 4/1955 | Logan et al. | 60—35.6 |
| 2,751,366 | 6/1956 | Braendle | 260—37 |
| 2,759,813 | 8/1956 | Feigley | 260—41.5 |
| 2,816,418 | 12/1957 | Loedding | 60—35.6 |
| 2,877,504 | 3/1957 | Fox | 60—35.6 |
| 2,835,107 | 5/1958 | Ward | 60—35.6 |
| 2,844,939 | 7/1958 | Schultz | 60—35.6 |
| 2,880,191 | 3/1959 | Newton et al. | 260—41.5 |
| 2,884,402 | 4/1959 | Bachmann et al. | 260—41.5 |
| 2,885,381 | 5/1959 | Svetlik | 260—41.5 |
| 2,894,926 | 7/1959 | Jacobson | 260—41.5 |
| 2,964,490 | 12/1960 | Howland et al. | 260—41.5 |
| 3,017,746 | 1/1962 | Kiphart | 60—35.6 |
| 3,027,709 | 4/1962 | Welder | 60—35.6 |
| 3,044,256 | 7/1962 | Bayly et al. | 60—35.6 |

FOREIGN PATENTS

| | | |
|---|---|---|
| 746,214 | 3/1956 | Great Britain. |
| 757,890 | 9/1956 | Great Britain. |
| 819,471 | 9/1959 | Great Britain. |

OTHER REFERENCES

Clorowax publication, Diamond Alkali Company, 1956, Cleveland, Ohio, pp. 3, 8, 9, 18 and 30.

Simonds et al.: Handbook of Plastics, D. Van Nostrand Co., Inc., New York, N.Y., chapter 5, p. 232, 1943.

MORRIS LIEBMAN, *Primary Examiner.*

ALAN I. BLUM, SAMUEL LEVINE, *Examiners.*

C. R. CROYLE, D. C. KOLASCH, A. LIEBERMAN,
*Assistant Examiners.*